(12) United States Patent
Chow et al.

(10) Patent No.: US 7,325,141 B2
(45) Date of Patent: Jan. 29, 2008

(54) METHOD AND SYSTEM FOR SECURE ACCESS

(75) Inventors: Stanley T. Chow, Nepean (CA); Harold J. Johnson, Nepean (CA); Yuan Gu, Kanata (CA)

(73) Assignee: Cloakware Corporation, Kanata, Ontario (CA)

( * ) Notice: Subject to any disclaimer, the term of this patent is extended or adjusted under 35 U.S.C. 154(b) by 563 days.

(21) Appl. No.: 10/240,812

(22) PCT Filed: Apr. 5, 2001

(86) PCT No.: PCT/CA01/00467

§ 371 (c)(1),
(2), (4) Date: Feb. 3, 2003

(87) PCT Pub. No.: WO01/77788

PCT Pub. Date: Oct. 18, 2001

(65) Prior Publication Data

US 2004/0078775 A1    Apr. 22, 2004

(30) Foreign Application Priority Data

Apr. 5, 2000  (CA) .................................. 2304433

(51) Int. Cl.
*H04L 9/00* (2006.01)
*H04L 9/32* (2006.01)
*H04K 1/00* (2006.01)
*G06F 11/30* (2006.01)
*G06F 7/04* (2006.01)
*G06F 17/30* (2006.01)
*G06K 9/00* (2006.01)

(52) U.S. Cl. ................ 713/183; 713/150; 713/182; 713/187; 713/189; 726/2

(58) Field of Classification Search .................... 726/2; 713/150, 182, 187, 189
See application file for complete search history.

(56) References Cited

U.S. PATENT DOCUMENTS 647,895 A *  4/1900  Fischer .......................... 4/309

(Continued)

FOREIGN PATENT DOCUMENTS

EP       0647895 A1      5/1994

OTHER PUBLICATIONS

"Commercial Key Recovery" Walker et al., *Communications of the ACM*, Mar. 1996, vol. 39, No. 3, pp. 41-47.

(Continued)

*Primary Examiner*—Nasser Moazzami
*Assistant Examiner*—Chinwendu C Okoronkwo
(74) *Attorney, Agent, or Firm*—Lynn S. Cassan

(57) ABSTRACT

If a user loses his password or pass phrase required for a computer or communication system, he must have some way of obtaining a new one. Typically, new passwords are provided to users manually, by another human, an approach that is expensive and insecure. The invention provides an automated solution which allows recovery of secure access. The invention does this by complementary encryption of the user's pass phrase and responses to personal questions, the reference responses being encrypted with the pass phrase and the pass phrase being encrypted with the reference responses. When a user loses his pass phrase, he can provide answers to the personal questions and the system will recover both the reference responses and the pass phrase, so the account can be re-initialized by entering a new pass phrase. The invention also allows "approximate matching", so biometric data can be used for identification.

21 Claims, 12 Drawing Sheets

U.S. PATENT DOCUMENTS 5,719,941 A * 2/1998 Swift et al. ................. 713/155
5,991,882 A    11/1999 O'Connell ................. 713/201

OTHER PUBLICATIONS

"Verifiable Partial Key Escrow" Bellare et al.,*ACM*, 1997, pp. 78-91.

"A Taxonomy for Key Escrow Encryption Systems", Denning et al, *Communications of the ACM*, Mar. 1996, vol. 39, No. 3, pp. 34-40.

"The "Omega" Key Management Service", Reiter et al., *CCS*, 1996, pp. 38-47.

"Robust Sharing of Secrets When the Dealer is Honest of Cheating", Rabin, *Journal of the Association for Computing Machinery*, vol. 41, No. 6, Nov. 1994, pp. 1089-1109.

"Password Recovery Windows Toolkit", Held, *International Journal of Network Management*,1998, pp. 368-370.

"Protecting Secret Keys with Personal Entropy", Ellison et al., Oct. 28, 1999, pp. 1-13.

"Cryptographic Solution to a Multilevel Security Problem", Akl et al., *Cryptography and Multilevel Security*, pp. 237-249.

"Secret Sharing Homomorphisms: Keeping Shares of a Secret (Extended Abstract)" Benaloh, pp. 251-260.

"Generalized Secret Sharing and Monotone Functions" Benaloh et al., pp. 27-35.

"Safeguarding Cryptographic Keys", Blakley, National Computer Conference, 1979, pp. 313-317.

"The Detection of Cheaters in Threshold Schemes", Brickell et al., pp. 564-577.

"Verifiable Secret Sharing and Achieving Simultaneity in the Presence of Faults", Chor et al., 1985, pp. 383-395.

"Secret Sharing Scheme Realizing General Access Structure", Ito et al., *Globecom*, 1987, pp. 3.6.1-3.6.4.

"A Generalized Secret Sharing Scheme with Cheater Detection", Lin et al., pp. 149-158.

"How to Share a Secret", Shamir, *Communications of the ACM*, Nov. 1979, vol. 22, No. 11, pp. 612-613.

"How to Share a Secret with Cheaters", Tompa et al.,*Journal of Cryptology*, 1988, pp. 133-138.

* cited by examiner

| SPLIT [n, t] | split a secret into "n" shares, "t" of which are needed to recover the secret |

| UNSPLIT [n, t] | given "t" of the shares and an indication of which "t" out of "n" shares they are, recover the secret |

| UNSPLITALL [n, t] | given "n" shares, try all possible subsets of "t" out of "n" shares until a subset is encountered which recovers the secret |

→ arrow indicating data path for one value

⟶ arrow indicating data path for multiple values

| HASH ($q_i$ + $a_i$ + $r_s$) |

FIGURE 10C

METHOD AND SYSTEM FOR SECURE ACCESS

The present invention relates generally to computer software, and more specifically, to a method and system of secure recovery in a password or pass phrase environment.

BACKGROUND OF THE INVENTION

The use of computers and computer networks is now almost pervasive in industrialized countries. Hardly a business exists that does not rely on computers and software either directly or indirectly, in their daily operations. As well, with the expansion of powerful communication networks such as the Internet, the ease with which computer software and data may be accessed, exchanged, copied and distributed is also growing daily. With this growth of computing power and communication networks, it is more critical than ever to control access to these resources, preventing unwanted parties from accessing confidential software and data.

Access to computer systems is often protected by a password consisting of a single word, or a pass phrase consisting of a string of words or characters. A pass phrase has the advantage over shorter passwords in that it can have sufficient information content to permit its conversion into a secure cryptographic key by the use of a cryptographically strong hash function. A cryptographically strong hash function generates what appears to be a random number from a given input, however, a given input will only generate one specific output. On the other hand, cryptographically strong hash functions are "non-reversible" in that given the function and a product of the function, an impractically large degree of processing must be performed to determine the value of the operand (testing all combinations for a 64-bit hash code, for example, would require 500 million years, at a rate of 100 million tests per second). Such functions are well known in the art, and include MD5 from RSA and the SHA algorithm from NIST.

Access control via passwords and pass phrases is part of a broader subject of "authentication". Authentication is basically the verification of one party's identification to another party. These parties may be individuals, software or hardware. A user may, for example, have to authenticate to a piece of local software to operate a software package or access a stored data file, authenticate to a local server in an office environment, or authenticate to a remote server over the Internet, in an e-commerce environment. The parties to which the user authenticates are referred to as authenticators. The user may be considered the authenticatee, or he may use a piece of software which performs the authentication on his behalf.

When a user employs a high-quality password or pass phrase (that is, one resistant to cracking), avoids recording it where a hostile person might find it, and succeeds in remembering it, the password or pass phrase provides convenient and secure access to the resources which it protects.

However, there are significant difficulties with the use of passwords or pass phrases:

1. Passwords or pass phrases which are resistant to brute-force cracking (such as a "dictionary attack" where access attempts are made by randomly selecting words from a dictionary) are difficult for their users to remember reliably, especially if periods of use are interspersed with periods during which they are unused, such as vacations. This results in calls to support staff for the recovery or replacement of forgotten passwords or pass phrases, which can be a significant operating cost.

Moreover, the provision of new passwords or pass phrases by such support staff is itself a significant security risk. (Why crack a password when you can have one given to you by employing a little acting talent?)

2. Passwords or pass phrases which are easy to remember are typically easier to crack because the user generally employs data he is already familiar with such as birth dates of family members, postal addresses and telephone numbers. These passwords can often be determined by a little searching plus some applied detective work.

3. A password or pass phrase generally applies to a unique resource, so that the problems with passwords are exacerbated by the need for a user to have several of them, one per resource.

If their security could be improved while avoiding the normal overhead incurred for replacement of forgotten, lost, or compromised high-quality passwords or pass phrases, a single point of access could be applied securely to more than one resource.

In their paper, Protecting Secret Keys with Personal Entropy (available on the Internet at http://www.counterpane.com/personal-entropy.html), Carl Ellison, Chris Hall, Randy Milbert, and Bruce Schneier propose replacing a single, high-quality pass phrase with a series of simpler pass phrases which may be of lower quality individually, but are of sufficient quality considered together. The user is prompted to respond to a series of questions or hints, each response being one of these simpler pass phrases.

In order to deal with the problem of forgetting, they propose a fault-tolerant usage for these simpler pass phrases. That is, the user is only required to provide correct answers to a predetermined proportion of the questions (t out of n).

The method of Ellison et al. is presented in the flow diagrams of FIGS. 1 and 2. An explanation of the notation used in FIGS. 1 and 2 is presented in FIGS. 10A through 10C.

The setup procedure 10 for the Ellison method is presented in FIG. 1. As preparation for this procedure, a set of data 12 has been generated including:

an array of n questions, $q_1 \ldots q_n$;
   an array of n corresponding answers, $a_1 \ldots a_n$;
   a random 'salt' value, $r_s$; and
   a high-quality cryptographic key, s.

The questions $q_1 \ldots q_n$ and answers $a_1 \ldots a_n$ draw upon the authenticatee's (i.e. the user's) personal history and are established as part of an initialization routine. Generally, the initialization routine would pose questions having answers which would be obscure and very difficult for an attacker to determine, yet would be relatively easy for the user to remember, such as "what was the first car you drove?" or "what was the name of your first pet?" Ellison et al. provide much valuable advice on choosing good questions for this purpose.

The random 'salt' value, $r_s$, is simply a random number which could be generated by the setup routine, which is used to add further randomness into a hashing function in the routine. The high-quality cryptographic key, s, is the password which the user will employ to obtain access on a day-to-day basis.

As shown in FIG. 1, the cryptographic key, s, is split into n shares, $s_1 \ldots S_n$, using an n, t threshold sharing method 14. This is an operation where n new values are produced from one value, in such a way that only t of them (t<n) are needed to recover the one original value (see also block 230 in FIG. 10C). A technique for doing this which is known in the art is Shamir's method of using Lagrange polynomials. This sharing provides the basis for the fault tolerance of this method, which is described in greater detail hereinafter.

Note that the flow of the cryptographic key, s, to the splitting function 14 is represented by a thin line, which indicates a data path for a single value (per 238 of FIG. 10C). This is in contrast to the thicker lines which represent a data path for multiple values (per 236 of FIG. 10C).

Next, a cryptographic key, $k_i$ is generated for each corresponding pair of questions and answers, $(q_i, a_i)$ by performing a hashing function 16 on the $(q_i, a_i)$ pair and the random 'salt' value, $r_s$ (see also block 240 in FIG. 10C). These cryptographic keys, $k_1 \ldots k_n$, are used to encrypt 18 each corresponding share, $s_i$, of the user's high-quality cryptographic key, s, yielding a corresponding crypto-share, $c_i$, (see block 210 in FIG. 10A for an explanation of how encryption functions are presented in the figures).

The array of questions, $q_1 \ldots q_n$, the random 'salt' value, $r_s$, and the crypto-shares, $c_1 \ldots C_n$, are then stored 20 by the authenticator for later use, completing the setup procedure. Note that the authenticatee's answers have now been hashed and encrypted into a set of crypto-shares, $c_1 \ldots C_n$, which cannot be easily reversed to yield the reference answers, $a_1 \ldots a_n$. Thus, if these data were obtained by an attacker, he could not easily determine the original answers.

Under normal operation, the user may now access the secure server or software by supplying his high-quality cryptographic key, s, in response to a challenge. The authenticator simply compares the supplied cryptographic key to a stored copy of the original key, and grants access if they match. If this key is lost, compromised, or forgotten by the user, he will then have to initiate the access procedure 30 presented in FIG. 2.

The access procedure 30 begins by retrieving the previously stored array 32 of questions, $q_1 \ldots q_n$, the random 'salt' value, $r_s$, and the crypto-shares, $c_1 \ldots c_n$. The access routine will then challenge the user to provide answers to the array of questions, $q_1 \ldots q_n$, storing the user's responses as a new set 34 of answers, $a'_1 \ldots a'_n$. Note that these answers, $a'_1 \ldots a'_n$ may or may not match the reference answers, $a_1 \ldots a_n$.

The access routine then computes a cryptographic key, $k'_i$, by performing a hash 36 for each question-answer pair, $q_i$ and $a'_i$, using the stored random 'salt' value, $r_s$. Each cryptographic key, $k'_i$, is then used to decrypt 38 the corresponding crypto-share, $c_i$, yielding a new share, $s'_i$, (see block 212 in FIG. 10A for an explanation of how decryption functions are presented in the figures).

The fault-tolerant aspect of the Ellison method is now performed: an exhaustive search 40 for a subset of t out of the n shares is made until either all possible combinations have been exhausted without success, or a subset is found which permits the retrieval of s, the high-quality cryptographic key (see also block 234 in FIG. 10C). The fault-tolerant aspect of this approach is that it permits access if up to (n–t) of the questions are answered incorrectly. That is, the user is only required to provide correct answers to a predetermined number t, of the n questions.

The method presented by Ellison et al. has a number of problems which limit the degree of protection it offers, and hence, limit its usefulness. For example:

1. because the random 'salt' value, $r_s$, is stored and processed in an unprotected form with both the authentication and authenticatee, it could be located and used by an attacker;

2. for the cryptographic key, s, to be strong, it must be a long, nonsensical, string of characters. This would make it extremely difficult for the user to remember, but none of the alternatives is effective:
   a. writing the cryptographic key, s, down on paper, makes it vulnerable to discovery in a physical search;
   b. storing it on the local system, makes it vulnerable to discovery via an electronic search or attack; and
   c. retrieving it every time it is required by answering a series of questions, is a slow and effortful activity;
3. during retrieval, the answer to each question must be precisely correct. Thus, this method will not work for biometric data, for example;
4. because the attacker only has to get t of n answers correct, he, in effect, is allowed to choose which answers he can correctly determine;
5. the output of this technique is to retrieve the old key, which is not always the best strategy.

There is therefore a need for a password recovery system which is more practical for general day more to day use, and is more secure against attack.

SUMMARY OF THE INVENTION

It is therefore an object of the invention to provide a novel method and system of password or pass phrase recovery which obviates or mitigates at least one of the disadvantages of the prior art.

One aspect of the invention is broadly defined as a method of setup in an access recovery system, the method comprising the steps of: challenging an authenticatee to supply reference responses to one or more questions; challenging the authenticatee to supply a string of characters as a pass phrase; encrypting and saving the reference responses using the pass phrase as an encryption key; and encrypting and saving the pass phrase using the reference responses as an encryption key.

Another broad aspect of the invention is defined as a method of access recovery in response to a failure of an authenticatee to authenticate, the method comprising the steps of: challenging the authenticatee to supply responses to one or more stored questions; retrieving a stored pass phrase that had been encrypted with a set of reference responses as an encryption key; decrypting the encrypted pass phrase using the supplied responses, to generate a decrypted pass phrase; retrieving a stored set of reference responses that had been encrypted with a pass phrase as an encryption key; and decrypting the stored set of reference responses using the decrypted pass phrase; whereby the authenticatee may authenticate to the authenticator using the decrypted pass phrase, or re-initialize by use of the decrypted reference responses.

Another aspect of the invention is defined as an apparatus comprising: means for challenging an authenticatee to supply reference responses to one or more questions; means for challenging the authenticatee to supply a string of characters as a pass phrase; means for encrypting and saving the reference responses using the pass phrase as an encryption key; and means for encrypting and saving the pass phrase using the reference responses as an encryption key.

A further aspect of the invention is defined as a computer readable storage medium storing a set of machine executable code, the machine executable code being executable by a computer to perform the steps of: challenging an authenticatee to supply reference responses to one or more questions; challenging the authenticatee to supply a string of characters as a pass phrase; encrypting and saving the reference responses using the pass phrase as an encryption key; and encrypting and saving the pass phrase using the reference responses as an encryption key.

An additional aspect of the invention is defined as a computer data signal embodied in a carrier wave, the computer data signal comprising a set of machine executable code being executable by a computer to perform the steps of: challenging an authenticatee to supply reference responses to one or more questions; challenging the authenticatee to supply a string of characters as a pass phrase; encrypting and saving the reference responses using the pass phrase as an encryption key; and encrypting and saving the pass phrase using the reference responses as an encryption key.

BRIEF DESCRIPTION OF THE DRAWINGS

These and other features of the invention will become more apparent from the following description in which reference is made to the appended drawings in which:

FIGS. 10A through 10C present a legend for general interpretation of functions presented in FIGS. 1-2 and 5-8.

DETAILED DESCRIPTION OF PREFERRED EMBODIMENTS OF THE INVENTION

Figure 1:
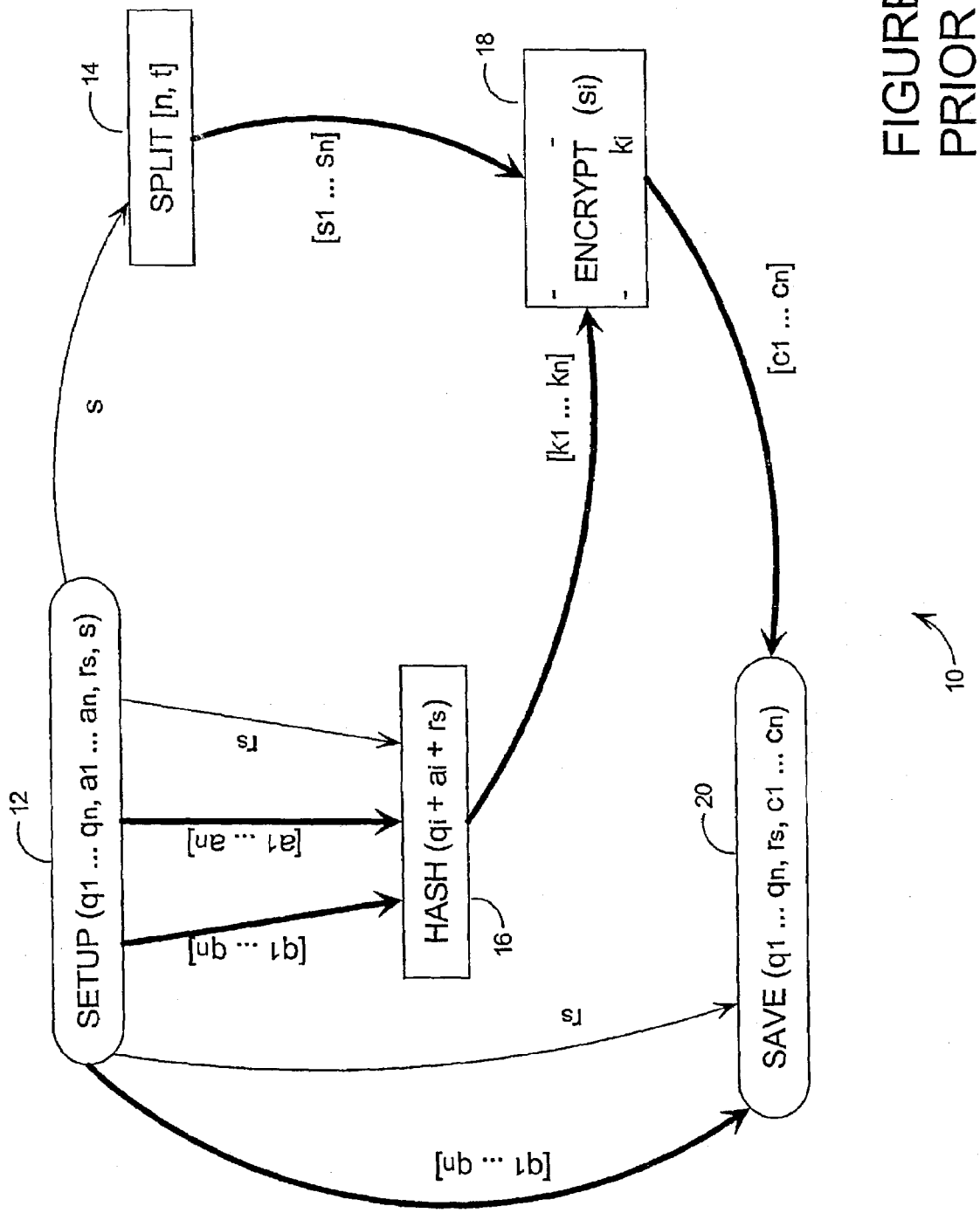
FIG. 1 presents a flow diagram of a set-up routine for a retrieval technique known in the art.
Figure 2:
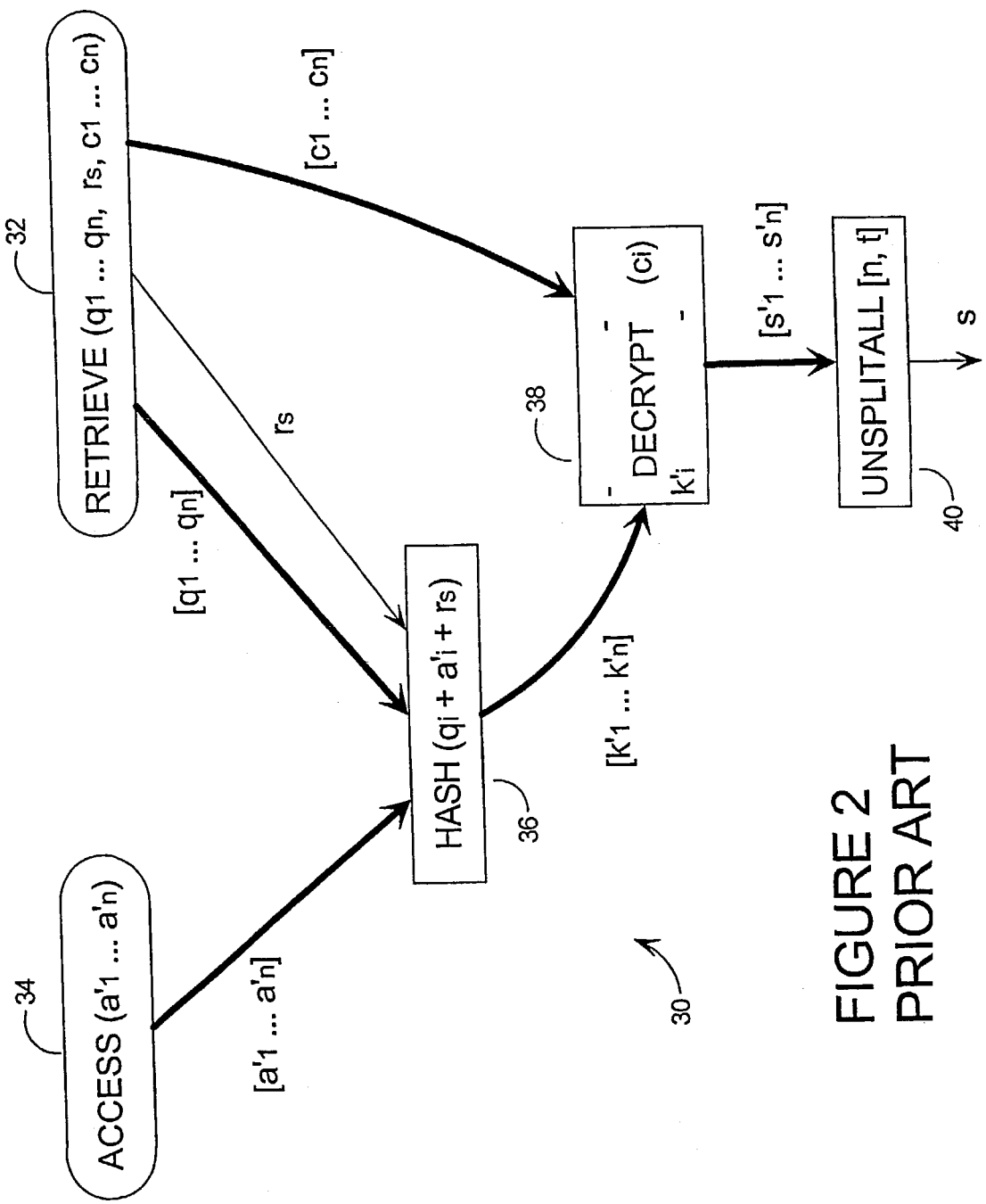
FIG. 2 presents a flow diagram of an access procedure for the retrieval technique known in the art.
Figure 3:
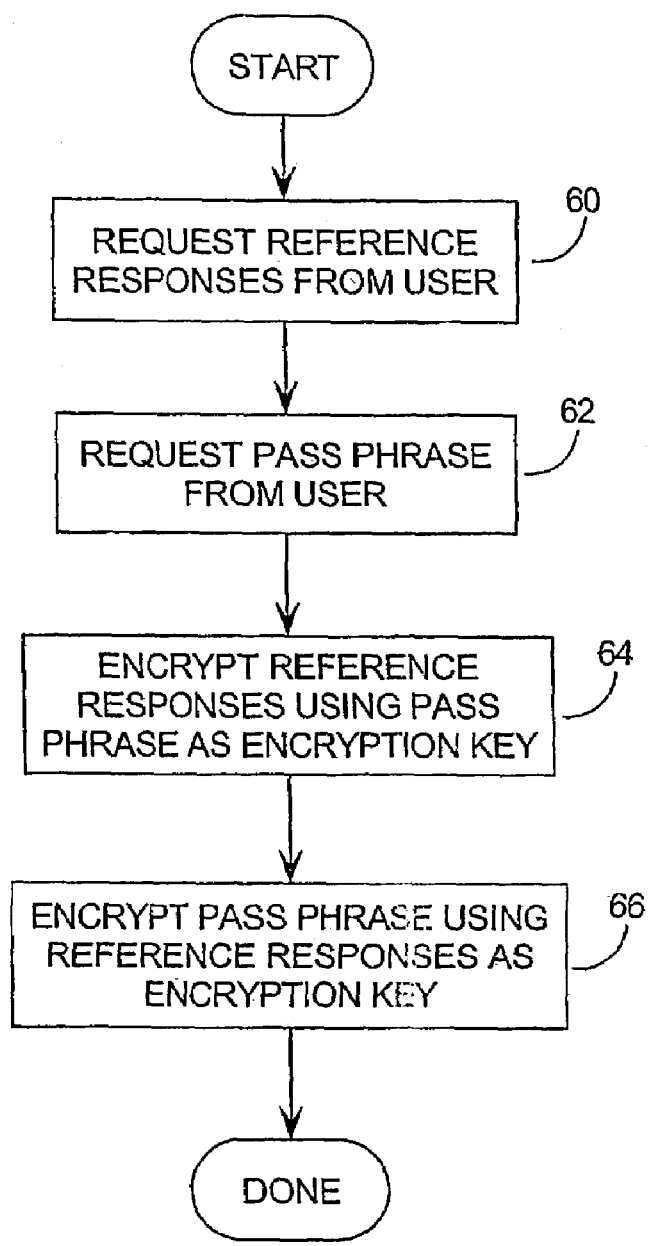
FIG. 3 presents a flow chart of a method of setting-up an access recovery routine in a broad embodiment of the invention.
Figure 4:
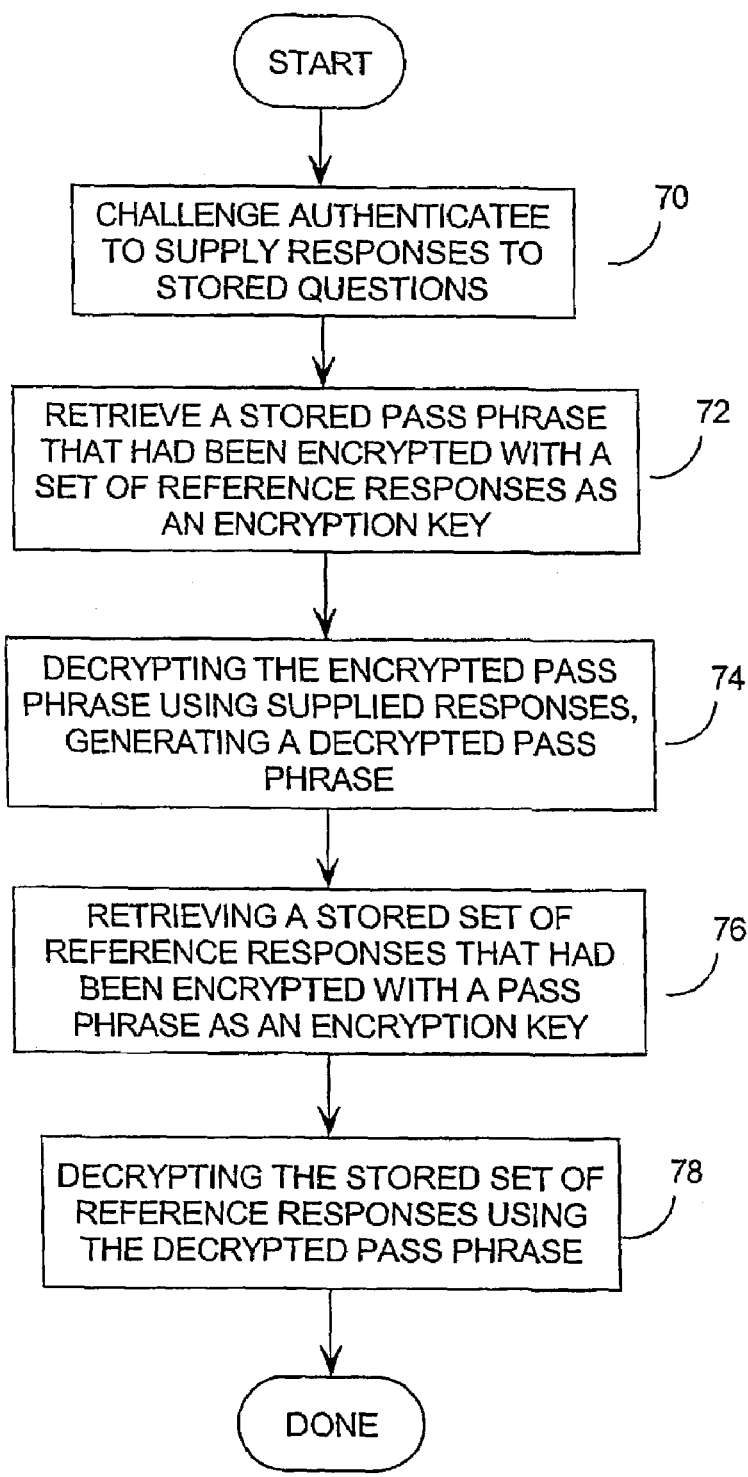
FIG. 4 presents a flow chart of a method of access recovery in a broad embodiment of the invention.

A method which addresses the objects outlined above, is described in terms of two main embodiments: one which requires an authenticatee's responses to match the reference responses exactly (the All-Cryptographic Variant) and one which allows approximate matching (the Flexible Matching Variant). The broad principle of the invention which is shared by both of these embodiments is presented in the flow charts of FIGS. 3 and 4. FIG. 3 presents the set up procedure required for day-to-day operation, and FIG. 4 presents the steps to perform access recovery.

In the general method of the invention, access is normally provided via a pass phrase. However, since pass phrases may be forgotten, lost or compromised, a recovery method is provided by which secure access can be recovered.

In general, the setup for the method of the invention proceeds as follows, per FIG. 3:

First, a set of n challenges, $q_1 \ldots q_n$, is prepared and saved. This set of challenges is presented to the authenticatee at step 60, soliciting an array of n reference-responses, $a_1 \ldots a_n$. The challenges used in the method of the invention may be broader than simply those taken from a user's personal history. The challenges may or may not be questions; the reference-responses may or may not be answers, and the responses provided during recovery may be required to match the reference-responses exactly, or may be permitted merely to approximate the reference-responses.

For example, the challenges may be one or more requests for biometric input (voice print, thumb print, retina print, signature ballistics via the mouse, or the like), and the reference-responses may be averaged values for such biometric inputs. These kinds of challenges call for matching by proximity; short of some future capability to read the user's DNA, biometric matches are necessarily approximate.

Next, the user is prompted to provide a pass phrase, P, at step 62, which will be used for day-to-day access. The set up routine preferably places restrictions on the form of a proposed pass-phrase, for example, setting a minimum number of words or characters, and not allowing a recent pass phrase to be re-used.

The reference-responses, $a_1 \ldots a_n$, supplied by the authenticatee, are then encrypted using the pass phrase, P, or some hashed or encrypted form of it, as an encryption key at step 64. The pass phrase, P, desirably provides sufficient entropy such that it can be hashed to a high-quality cryptographic key by some suitable cryptographically strong hash function. As will be described in greater detail hereinafter, this pass phrase, P, will generally be hashed to generate a strong cryptographic key, s. In analogy to the technique of Ellison et al., this high-quality key is referred to herein as "s".

These encrypted reference-responses are then stored in a retrievable location by the authenticator.

The authenticator then encrypts and saves the pass phrase P using the values of reference responses $a_1 \ldots a_n$ as an encryption key, at step 66.

At this point, the authenticatee can obtain permission to access the authenticator's resources by correctly providing the pass phrase, P. If the authenticatee loses, forgets, or believes the security of the pass phrase, P, has been breached, he can perform the access recovery routine of FIG. 4, to recover his secure access.

When the recovery routine has been initiated, the authenticator will first challenge the authenticatee at step 70, to supply responses $a'_1 \ldots a'_n$ to the questions, $q_1 \ldots q_n$, stored by the authenticator at step 60 of the setup procedure. As noted above, there may only be one question, and the questions may deal with the authenticatee's personal history, be a challenge to provide biometric data, or be some similar challenge that the authenticatee might have privileged knowledge of, or access to.

At step 72, the authenticator then retrieves the stored pass phrase, P, that was encrypted with the set of reference responses $a_1 \ldots a_n$ as an encryption key, at step 66 of the setup procedure. This encrypted pass phrase is decrypted at step 74, using the responses $a'_1 \ldots a'_n$ supplied at step 70. This generates a decrypted pass phrase which will be incorrect if the authenticatee provided responses $a'_1 \ldots a'_n$ at step 70 which do not match the stored reference responses $a_1 \ldots a_n$. The term 'match', may refer to either an exact match or an approximate match, depending on which variant of the invention is being used.

The authenticator now performs a similar routine on the stored set of encrypted reference responses at steps 76 and 78. The stored set of reference responses that were encrypted with a pass phrase as an encryption key at step 64 above, are retrieved by the authenticator. These stored reference responses are decrypted using the decrypted pass phrase as a key, at step 78. Note that this decrypted pass phrase was generated at step 74 above.

If the recovery has been successful, the authenticatee may authenticate to the authenticator using the decrypted pass phrase, or reinitialize his account by use of the decrypted reference responses.

The preferred embodiment of the invention is to distinguish between success and failure in an indirect way. Rather than indicating overtly to the authenticatee whether their attempt was successful, this embodiment simply implements the high-quality key, s, on the system resources in the manner the program is intended to. If the key, s, is correct, the system will operate properly, while if it is incorrect, the system will not. The advantage of this approach is that it will not always be clear to the attacker, whether they have been successful. For example, if the high-quality key, s, is protecting biometric data, their is no way for the attacker to determine whether the output biometric data is correct or nonsensical, simply by examining it. This introduces an inconvenience factor to the attacker. In a multi-step process, the attacker cannot determine whether his incremental determinations are correct.

Where the nature of the resources would make disambiguation by known form awkward for some reason, the problem can be simplified by encrypting s with itself as the key, and including the encrypted s among the protected resources. This does not compromise the security of s since, to access the stored encrypted s one would already need to know s. However, it permits easy recognition of correct recovery of s: a putative s value is correct if and only if decrypting the s resource with key s, yields s.

Alternatively, a hash other than encryption of s with s, could be used to hash s, yielding z. One cannot recover s from z, so security is not compromised. This technique can also be applied to splitting and unsplitting operations described hereinafter. If a cryptographic key is being processed in a split format, it can be un-split to recover s, which can be hashed and immediately checked to see whether it is correct: if so, the hash matches z; otherwise, it does not.

Once the system of the invention has been set up, day-to-day operation is very straight forward. In the day-to-day operation of the system of the invention, the user obtains access simply by entering a pass phrase P'. The pass phrase P' is hashed as in the setup, and if it is the same as the original pass phrase P, access is obtained. If it is not, the access attempt fails. This procedure applies to all variants of the invention.

The techniques known in the art simply offer a retrieval of the lost cryptographic key. The invention, in contrast, offers a recovery of the secure state of the user. Having the authenticator store the encrypted reference answers $a_1 \ldots a_n$ in an accessible location allows the leap from simple retrieval, to a comprehensive recovery solution. Recovery of the answers allows re-initialization to be performed with a new pass phrase, without the user having to re-enter answers, or even having to remember all the answers.

The invention can be applied in a wide variety of manners, for example, by adding further encryption or hashing steps as noted above. Several other modifications include:
1. encryption of the reference-responses, $a_1 \ldots a_n$, into corresponding keys, $k_1 \ldots k_n$ using a hidden key embedded in the software application. To protect this key, such a process should be cloaked in tamper-resistant, secret-hiding software, as described hereinafter;
2. an array of corresponding intermediate values, $u_1 \ldots u_n$, used in creating the keys, $k_1 \ldots k_n$, may or may not be saved, where the intermediate values are encrypted with a hidden key embedded in tamper-resistant, secret-hiding software;
3. the high-quality key, s, may be split into n shares, $s_1 \ldots s_n$, using an n, t threshold sharing method. Each $s_i$ may be encrypted with the corresponding $k_i$, yielding the crypto-share, $c_i$. The crypto-shares, $c_1 \ldots c_n$ are then stored; or
4. the recovery software may select which of the n original questions it wishes the authenticatee to respond to. This could be performed as follows: Inputs during the recovery procedure include an array of t candidate responses, $a'_1 \ldots a'_t$, and an array of t index values, $i_1 \ldots i_t$, which indicate which of the n reference-responses, $a_1 \ldots a_n$, are represented by the candidate responses. For example, if $i_2=5$, then $a'_2$ is the candidate response which should match $a_5$. The recovery routine records the index values, $i_1 \ldots i_t$, in order to properly match of the questions and answers.

Properties of the Access Recovery System of the Invention

The method of the invention has a number of properties which distinguish it from known techniques. For example:
1. The purpose of the system is to provide a means whereby a forgotten or otherwise lost pass phrase may be replaced by its user, without recourse to a privileged system administrator, and without revealing any secrets to any other party. Thus, the invention avoids the overhead cost and avenue for attack that such techniques suffer from. As well, the invention offers far more than simply securing a high-quality cryptographic key against loss, as in the prior art.
2. The high-quality cryptographic key is computed from the pass phrase during setup, rather than being an input to the routine.
3. The invention does not substitute fault-tolerant question and answer access for access via a pass phrase, as in the prior art. Instead, it substitutes some form of challenge-response access for pass phrase access when recovery from a lost pass phrase is required.
4. When exact matching is used in an embodiment of the invention, it is fault-intolerant, whereas the method of the prior art, is fault-tolerant when exact matching is used since it only requires an exact match for any t out of n answers. (The embodiments of the invention are, however, fault-tolerant by definition, when approximate matching is used.)
5. Recovery requires that the authenticatee correctly respond to the t of n questions selected by the routine. There is no exhaustive search for a matching subset, or allowance for the attacker to select which questions to answer, as in the prior art methods.
6. Recovery should normally result in changing the pass phrase, and hence the high-quality cryptographic key obtained from it.
    As noted above, the strategy of simply recovering the old key, may not be the best strategy in all cases. If the user loses the private key of a public/private key pair, it may be an effective strategy to retrieve the old key, because the alternative, changing the public/private key pair, requires notifying all public key holders of the change. However, if the user loses a symmetric key protecting a file, then a more effective approach is to replace the lost key with a new one. There is no cost to replacing the symmetric key, and it is more secure than simply re-using the same symmetric key.
7. The comprehensive security and recoverability of the invention allows users to rely on only one pass phrase rather than requiring several. This provides a great advantage in terms of pass phrase maintenance and administration.

These and other advantages are provided by the following embodiments of the invention:

All-cryptographic Variant

In this embodiment of the access recovery invention, exact matching of the candidate responses $a'_1 \ldots a'_t$ to the corresponding reference-responses selected from $a_1 \ldots a_n$ by the index values $i_1 \ldots i_t$ is required.

Figure 5:
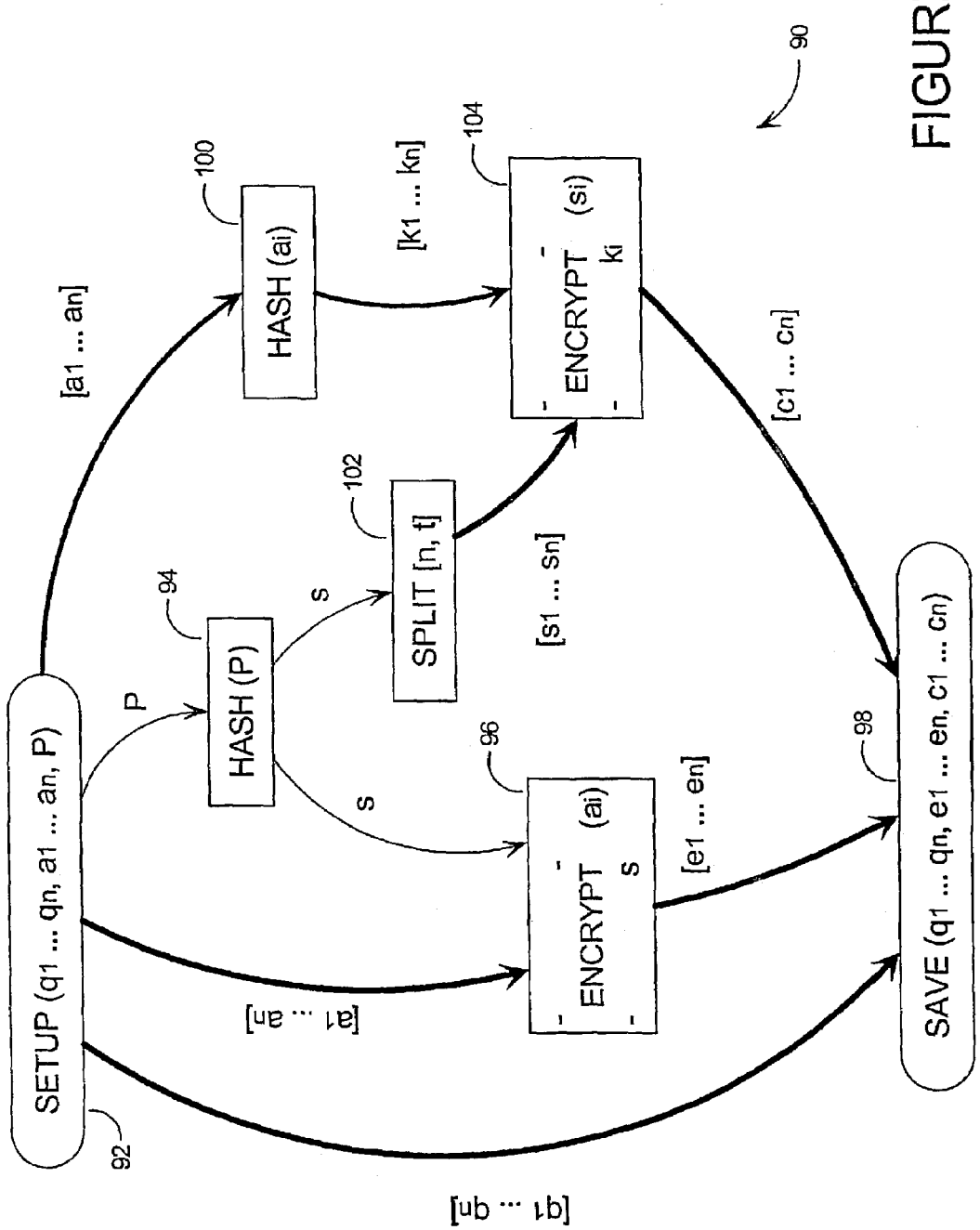
FIG. 5 presents a flow diagram of a set-up routine for cryptographic recovery in an embodiment of the invention.

The setup 90 for the all-cryptographic variant of the instant access recovery invention is shown in FIG. 5. It proceeds as follows:

To set up 92 the operation of the all-cryptographic variant of the invention, an array of n challenges, $q_1 \ldots q_n$, is generated, and the authenticatee is solicited to provide an array of n reference-responses, $a_1 \ldots a_n$, and a pass phrase, P. As explained above, the challenges may or may not be questions; the reference-responses may or may not be answers, but in this embodiment, the responses provided during recovery must match the reference-responses exactly. The challenges, $q_1 \ldots q_n$ are saved by the authenticator in an accessible location.

The pass phrase, P, is then hashed 94 to generate a cryptographic key, s. The reference-responses, $a_1 \ldots a_n$, are then encrypted 96 using s as the key, producing the encrypted reference-responses, $e_1 \ldots e_n$. These encrypted reference-responses are also saved 98 by the authenticator.

The reference-responses $a_1 \ldots a_n$, are then hashed 100, producing corresponding keys, $k_1 \ldots k_n$.

The high-quality key, s, is the split into n shares, $s_1 \ldots s_n$, using an n, t threshold sharing method 102 (see also block 230 in FIG. 10C). Each $s_i$ is encrypted 104 with the corresponding $k_i$, yielding the crypto-share, $c_i$. The crypto-shares, $c_1 \ldots c_n$ are also stored 98 by the authenticator, completing the set up routine.

The authenticatee may now obtain permission to access the authenticator's resources by providing the correct pass phrase, P. He may also recover secure access if this pass phrase, P, is lost, compromised, or forgotten.

Figure 6:
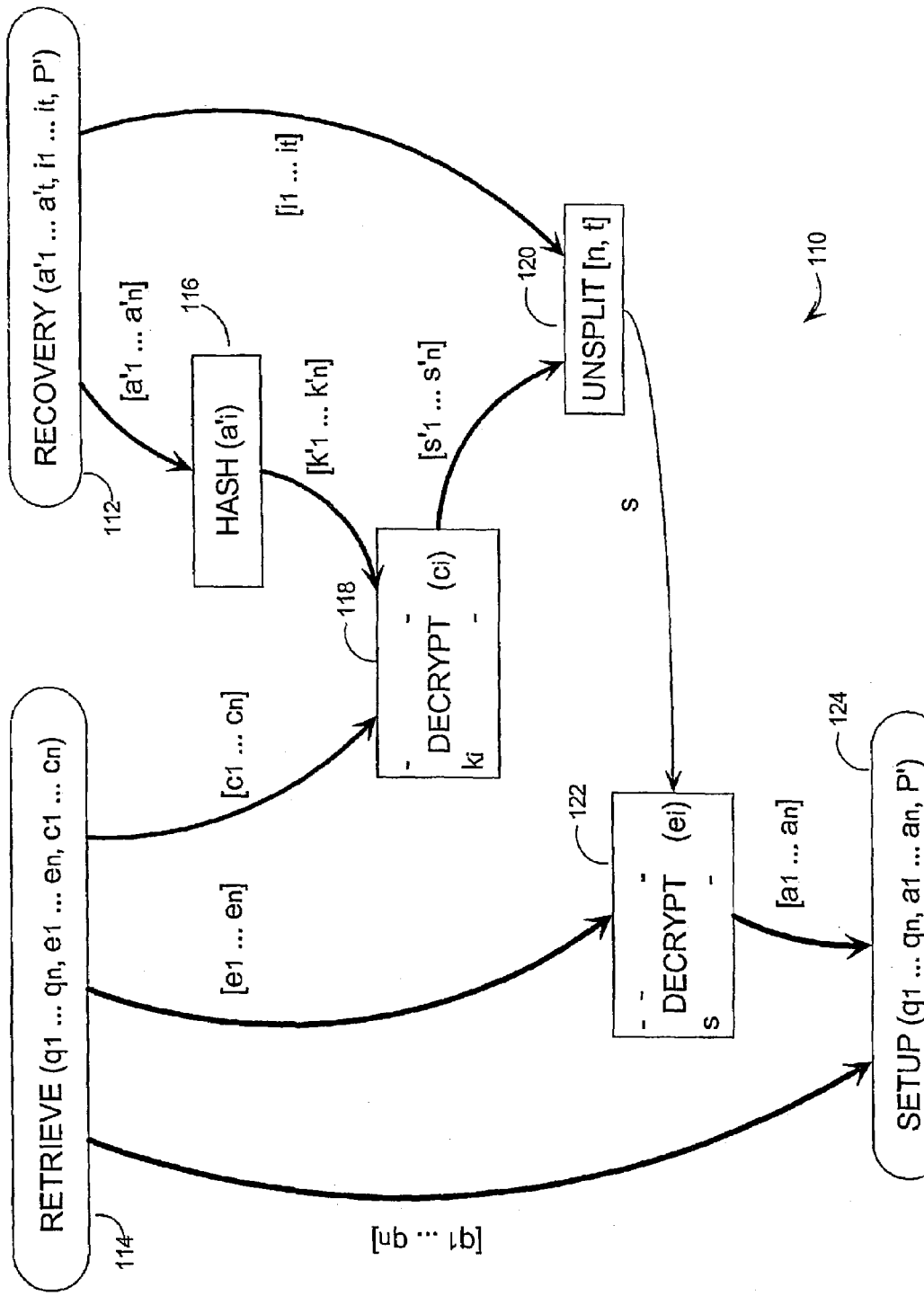
FIG. 6 presents a flow diagram of an access procedure for cryptographic recovery in an embodiment of the invention.

Recovery 110 for the all-cryptographic variant is presented in the flow diagram of FIG. 6. It proceeds as follows:

Firstly, a routine 112 is executed which determines which challenges should be made of the authenticatee. These challenges are then made, generating an array of t candidate responses, $a'_1 \ldots a'_t$, and an array of t index values, $i_1 \ldots i_t$, which indicate which of the n reference-responses, $a_1 \ldots a_n$, are represented by the candidate responses. For example, if $i_2=5$, then $a'_2$ is the candidate response which should match $a_5$.

This routine also queries the authenticatee to include a new pass phrase, P', which will then be the pass phrase used for normal access when the recovery process has been completed. It is recommended, for greater security, that this pass phrase be different from the original pass phrase. The fact that recovery is being performed indicates that the old pass phrase was either forgotten (in which case it may not be the best choice of pass phrase) or compromised (in which case it is imperative that a new pass phrase be chosen).

The retrieved values 114, which were stored during setup, are the challenges, $q_1 \ldots q_n$, the encrypted reference-responses, $e_1 \ldots e_n$, and the crypto-shares, $c_1 \ldots c_n$. The candidate keys, $k'_1 \ldots k'_t$, are then computed as a hash 116 of the corresponding candidate responses, $a'_1 \ldots a'_t$. The candidate keys, $k'_1 \ldots k'_t$, are then used to decrypt 118 the crypto-shares, $c_1 \ldots c_n$, yielding candidate shares, $s'_1 \ldots s'_t$.

The splitting process is then reversed 120, using $s'_1 \ldots s'_t$ and $i_1 \ldots i_t$, yielding what should be the high-quality cryptographic key, s (see also block 232 in FIG. 10C). If it is not, the recovery procedure fails. Note that there is no exhaustive search for a subset of the candidate responses which can be used to recover the shares correctly: instead, $i_1 \ldots i_t$, are used to identify which reference-responses the candidate responses should match, and therefore which shares are being provided to the un-splitting procedure which merges the shares back into the original high-quality key.

Assuming that the user has succeeded in recovering the high-quality cryptographic key s, the encrypted reference-responses, $e_1 \ldots e_n$, are then decrypted 122 to obtain the original reference-responses, $a_1 \ldots a_n$. A new setup procedure is then performed using the retrieved challenges, $q_1 \ldots q_n$, the reference-responses, $a_1 \ldots a_n$, and the new pass phrase P' as its inputs 124. This completes the recovery routine.

Flexible Matching Variant

This variant of the access recovery system permits approximate matching, suitable for use where fault-tolerance is required, as in the use of biometric responses. Approximate matching is infeasible for purely cryptographic challenge-response systems, such as the method of Ellison et al.

Various tools are available which allow a hostile party to access and analyse the state of running programs. This would allow a hostile party to harvest the original biometric data of the user. As noted above, it is critical to protect this data in some manner because a given user only has two retinas and two thumb prints; once these data are compromised, they are no longer secure.

While these data could be protected by processing them on a physically secure computer, the preferred embodiment is to process them using tamper-resistant, secret-hiding software. Techniques for effecting tamper-resistant, secret hiding software are described hereinafter.

Thus, this embodiment of the invention avoids the need for strict matching by permitting the use of proximity-based matching functions, while still preserving secrecy for the matching data by using these proximity-based matching functions in the form of tamper-resistant, secret-hiding software.

The design of this variant is carefully constructed to ensure that a high degree of security is obtained without pervasive use of tamper-resistant, secret hiding software. In fact, the use of tamper-resistant, secret-hiding software is limited to three special functions. The remainder of an implementation needs only ordinary software. Nevertheless, the operation of the recovery routine is secure against compromise of both pass phrase and reference-response information, even where the reference-response information is suited to approximate matching (as occurs when the reference-responses are derived from biometric information about the user).

Figure 7:
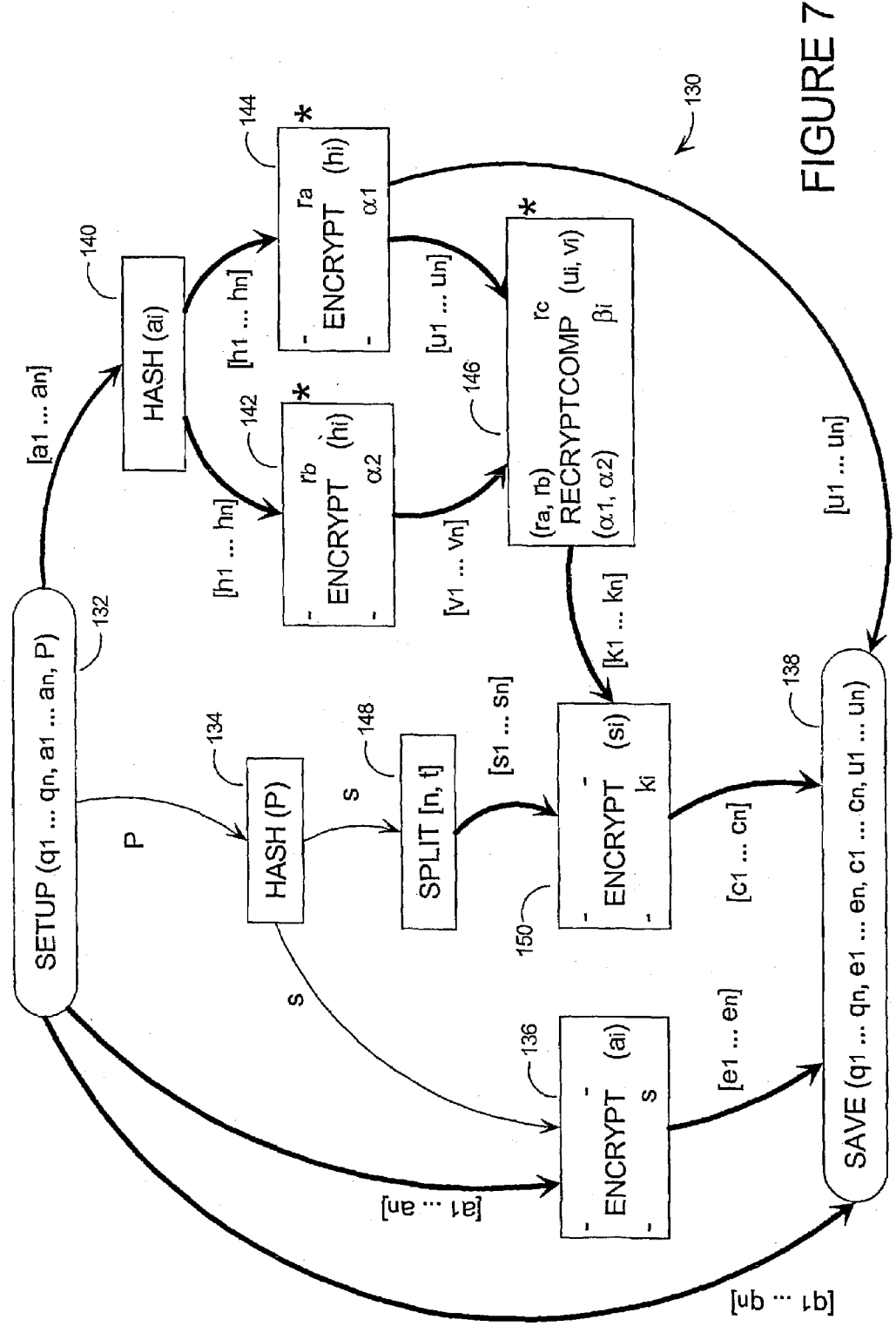
FIG. 7 presents a flow diagram of a set-up routine for flexible matching recovery in an embodiment of the invention.

Set up for the flexible matching variant 130 of the invention is presented in FIG. 7. It proceeds as follows:

As described above, the first step is to perform an initialization routine 132 which prepares and saves a set of challenges, $q_1 \ldots q_n$. This routine also challenges the authenticatee to respond to these challenges, storing the results in a set, $a_1 \ldots a_n$, and to provide a pass phrase, P.

The pass phrase, P, is hashed 134 to generate a strong cryptographic key "s". The reference-responses, $a_1 \ldots a_n$, are then encrypted 136 using s as the key, producing the encrypted reference-responses, $e_1 \ldots e_n$. These encrypted reference-responses are saved 138 by the authenticator in an accessible location, so they can be accessed during the recovery routine.

Optionally, the reference-responses, $a_1 \ldots a_n$, are then hashed 140, yielding corresponding hash-values, $h_1 \ldots h_n$. If this hashing is omitted, then the $h_1 \ldots h_n$ are equal to the corresponding $a_1 \ldots a_n$ in FIG. 7. In the case where approximate matching by proximity to reference responses is employed, any hash at this step would have to preserve information about proximity. For example, raw biometric data are generally subjected to feature extraction, which reduces the raw volume and keeps only relevant information. (In finger-print identification, it keeps major patterns of whorls, tented arches, and the like, and eliminates variations due to finger-placement on the reader. A similar process is used for retina prints, voice prints, and so on.) This is a form of irreversible compression. If it is followed by encryption, the combined function is a hash, not a cipher (since some information has been lost) which preserves the information used in comparing proximity to a reference value (since the relevant information which is used in proximity decisions is still present). If it is not convenient to insert a hash here, it can simply be omitted.

Two encryption functions 142, 144 and a recryption function 146 are now used to inject additional randomness into the process. The essence of these three functions, is to create two separate sets of intermediate data which describe the reference answers, but only one is saved by the authenticator. The attacker will never be able to determine whether he has created a correct intermediate set of data by comparing it to the stored set, because they will not match when the correct answers are given (because they were encrypted with a different key).

As well, the recryption function adds to the attacker's confusion, because it replaces its normal response with an alternative hash when an incorrect answer has been entered. Since both the normal response and the alternative hash approximate the cryptographic 'full cascade' property, the two cases are indistinguishable to the attacker. Thus the attacker cannot obtain any useful data by observing the output for an incorrect input, other than observing ultimately that the recryptor has not provided a key which provides access to the protected information.

In detail, these processes are effected as follows: first, separate values $u_i$ and $v_i$, are computed 142, 144 from each $h_i$ to provide two arrays of encrypted and obscured values $u_1 \ldots u_n$ and $v_1 \ldots v_n$, respectively, corresponding to the array $a_1 \ldots a_n$ of reference-responses. These two arrays contain different values, but both completely describe the original $h_1 \ldots h_n$ array. Note that only the $u_i$ array of encrypted and obscured values $u_1 \ldots u_n$ is then saved 138 by the authenticator.

To compute each $u_i$, a tamper-resistant, secret-hiding function is applied to the corresponding $h_i$. The function encrypts $h_i$ with a hidden key, $\alpha_1$, and also encodes the encrypted result with an obscure encoding, $r_a$. This function will be referred to herein as the $\alpha_1$ shielded encryptor 144. Similarly, $v_i$ is computed from $h_i$, but using a tamper-resistant, secret-hiding function which encrypts with a hidden key $\alpha_2$ and produces its result with the obscure coding $r_b$. This function will be referred to herein as the $\alpha_2$ shielded encryptor 142.

Figure 10A:
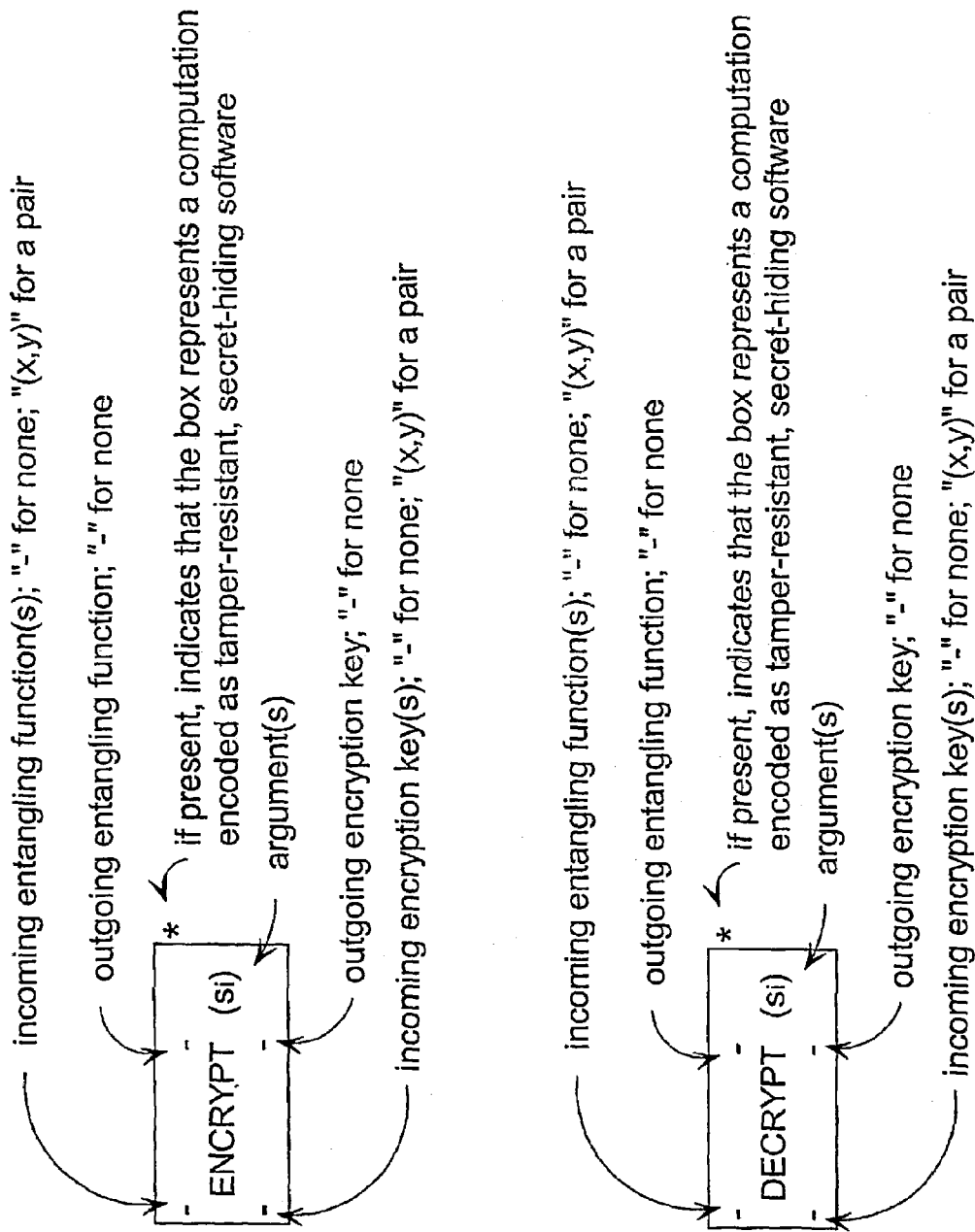

Block 210 in FIG. 10A describes how encryption functions are presented in the figures. Note that both the $\alpha_2$ shielded encryptor 142 and the $\alpha_1$ shielded encryptor 144 are described as "entangling functions" in that they both encrypt and obfuscate their input data. As well, they are "entangled computations" in that the computations themselves are performed using tamper-resistant, secret-hiding software. This prevents the encryption and obfuscation keys being used, from being identified by an attacker and removed from the data being processed.

From each $(u_i, v_i)$ pair, a cryptographic key $k_i$ is then computed by applying a tamper-resistant, secret-hiding function which accepts a first input encrypted with hidden key $\alpha_1$ and obscured by encoding $r_a$, and a second input encrypted with hidden key $\alpha_2$ and obscured by encoding $r_b$, and produces a result encrypted with hidden key $\beta$ and obscured by encoding $r_c$.

Figure 10B:
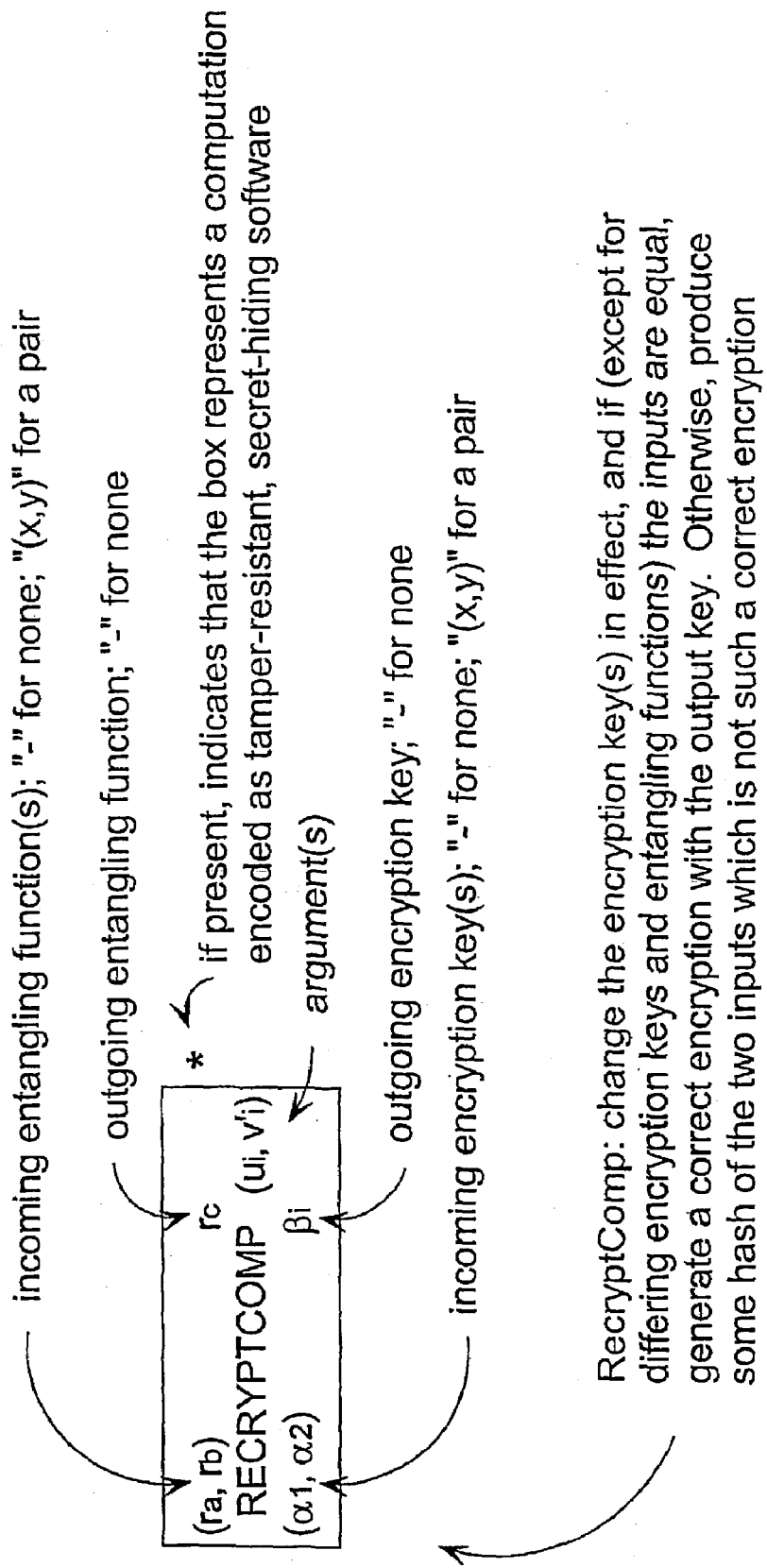

This recrypting function 146 receives a pair of values and outputs a single result which has the following property: if the result of undoing obscure coding $r_a$ and decrypting with key $\alpha_1$ for its first input matches the result of undoing obscure coding $r_b$ and decrypting with key $\alpha_2$ for its second input (where 'matching' may be exact or approximate matching, as desired) then the function outputs the result of undoing obscure coding $r_a$ and decrypting with key $\alpha_1$ for its first input, and then encrypting it with key $\beta$ and obscuring it with obscure coding $r_c$. Otherwise, a different result is produced which is some hash of either or both inputs. This function will be referred to herein as the shielded recrypting comparator (see block 220 in FIG. 10B for an explanation of how recryption functions are presented in the figures).

The pseudo-code representation of this shielded recrypting comparator is as follows:

RecryptComp(x, y)$=_{def}$
    if match (plain_x, plain_y)
        then encode ($r_c$, encrypt ($\beta$, plain_x))
        else someHash (x, y)
    where
        plain_x$=_{def}$ decrypt ($\alpha_1$, decode ($r_a$, x))
        plain_y$=_{def}$ decrypt ($\alpha_2$, decode ($r_b$, y))

(In the above equivalent function, match is the desired matching function, whether exact or approximate; encode and encrypt are as above, decode and decrypt are functions such that:

decrypt ($\gamma$, encrypt ($\gamma$, x))=x and:

decode (r, encode (r, x))=x for any key $\gamma$, any obscure encoding r, and any value x, and someHash is a hash function, preferably cryptographically strong, which has a high probability of producing a result different from:

encode ($r_c$, encrypt ($\beta$, plain_x))

above, to ensure that the matching and non-matching cases yield different results.)

The functionality of the shielded recrypting comparator ensures that its inputs are differently encrypted and differently obscured, providing a maximum of protection for information, such as biometric information, to be compared by it. Its implementation as tamper-resistant, secret-hiding software, such as that produced using data flow encoding and control flow encoding ensures that its functionality is as above while its implementation does not separate the encoding and encryption, nor its decoding and its decryption, and that during its computation, all data are encoded at all times, and that no fixed control path through the computation exists.

Since the output is used as a key, any risk associated with a pass/fail output such as a Boolean result is completely avoided, even where the remainder of the software, other than the three shielded functions (i.e., other than the $\alpha_1$ and $\alpha_2$ shielded encryptors 142, 144 and the shielded recrypting comparator 146) is ordinary, unprotected software which is neither tamper-resistant nor secret hiding. This ensures that attacks on the system comprise only: penetration of the tamper-resistant, secret-hiding software, cracking the pass phrase, or decryption of the stored intermediates $u_1 \ldots u_n$ in the absence of the relevant cryptographic key, $\alpha_1$, needed to decrypt them, or knowledge of the obscure encoding, $r_a$, needed to decode them.

The high-quality key, s, is then split 148 into n shares, $s_1 \ldots s_n$, using an n, t threshold sharing method (see also block 230 in FIG. 10C). Each $s_i$ is then encrypted 150 with the corresponding $k_i$, yielding the crypto-share, $c_i$. The crypto-shares, $c_1 \ldots c_n$, are then stored by the authenticator in an accessible location.

Figure 8:
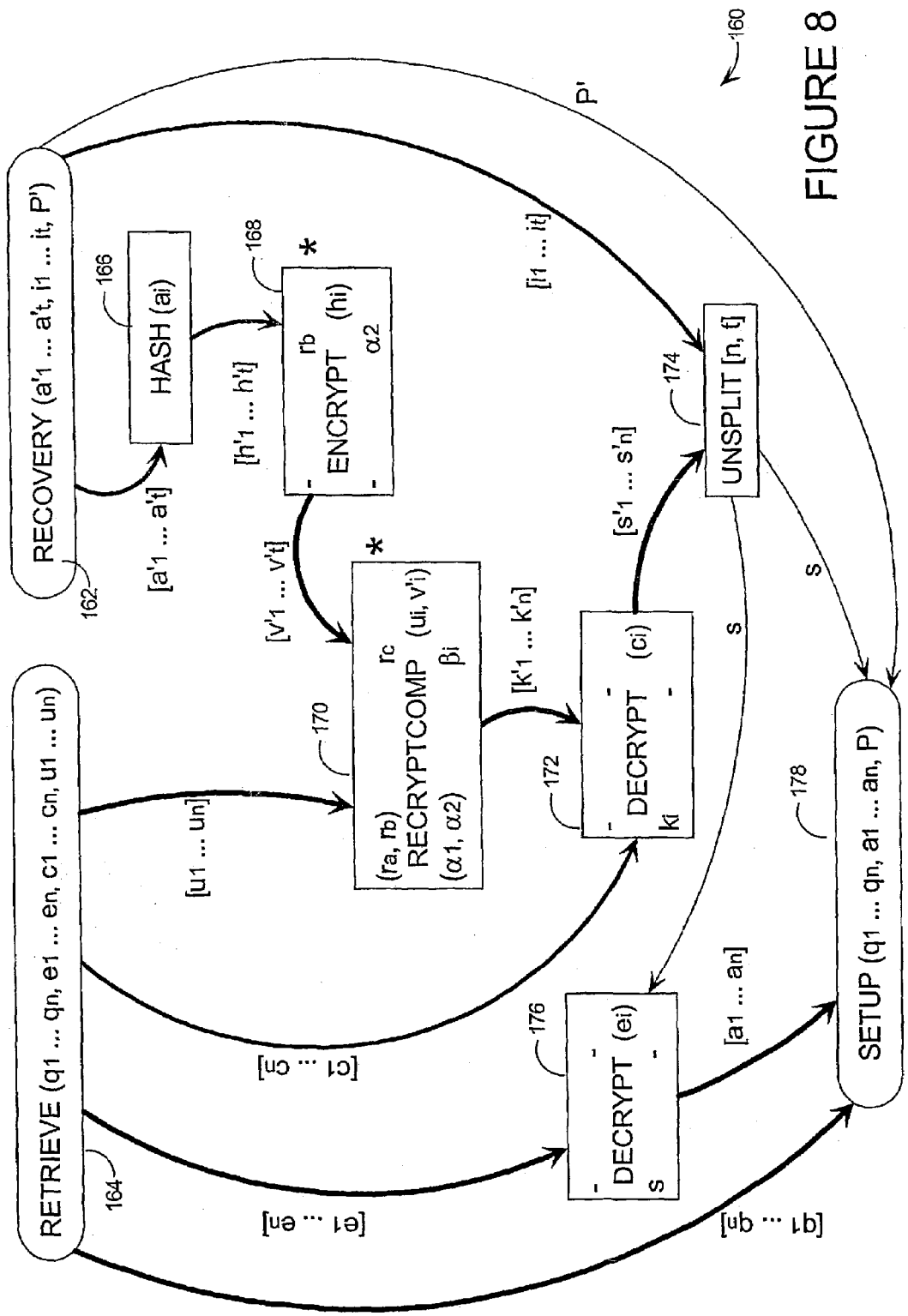
FIG. 8 presents a flow diagram of an access procedure for flexible matching recovery in an embodiment of the invention.

Recovery 160 for the flexible matching variant of the invention proceeds as presented in the flow diagram of FIG. 8.

As in block 112 of FIG. 6, the first step is to execute a routine 162 which determines which challenges should be made of the authenticatee. These challenges are then made, generating an array of t candidate responses, $a'_1 \ldots a'_t$, and an array of t index values, $i_1 \ldots i_t$, which indicate which of the n reference-responses, $a_1 \ldots a_n$, are represented by the candidate responses.

This routine also queries the authenticatee to include a new pass phrase, P', which will then be the pass phrase used for normal access when the recovery process has been completed.

The retrieved values 164, which were stored during setup 130, are the challenges, $q_1 \ldots q_n$, the encrypted reference-responses, $e_1 \ldots e_n$, the encrypted intermediate values, $u_1 \ldots u_n$, which were encrypted using a key hidden in tamper-resistant, secret-hiding software and then further obscured, and the crypto-shares, $c_1 \ldots C_n$.

Using the candidate responses, $a'_1 \ldots a'_t$, and the members of $u_1 \ldots u_n$ selected by the index values, $i_1 \ldots i_t$, the corresponding candidate keys, $k'_1 \ldots k'_t$, are computed, and used to decrypt the crypto-shares, yielding candidate shares, $s'_1 \ldots s'_t$.

To do this, if $a_1 \ldots a_n$ was hashed to produce $h_1 \ldots h_n$ during the setup above, then $a'_1 \ldots a'_t$ is hashed 166 during recovery, yielding corresponding $h'_1 \ldots h'_t$. Otherwise, $h'_1 \ldots h'_t$ are equal to the corresponding $a'_1 \ldots a'_t$. The members of the array $h'_1 \ldots h'_t$ are then passed through the $\alpha_2$ shielded encryptor 168, yielding corresponding the $v'_1 \ldots v'_t$ array.

Corresponding $(u_i, v'_i)$ pairs are then processed through the shielded recrypting comparator 170, yielding corresponding keys $k'_1 \ldots k'_t$. These keys $k'_1 \ldots k'_t$ are used to decrypt 172 the members of $c_1 \ldots c_n$ selected by $i_1 \ldots i_t$, yielding corresponding $s'_1 \ldots s'_t$. If the shielded recrypting comparator 170 determined that each $u_i$ matches its corresponding $v'_i$, then $k'_1 \ldots k'_t$ will be correct and recovery of the s used in the setup procedure will succeed. Otherwise, it will fail.

The splitting process is then reversed 174, using $s'_1 \ldots s'_t$ and $i_1 \ldots i_t$, yielding what should be the high-quality cryptographic key, s (see also block 232 in FIG. 10C). If it is not, the recovery procedure fails.

Assuming that the recovery of the high-quality cryptographic key s has been successful, the encrypted reference-responses, $e_1 \ldots e_n$, are decrypted 176 obtaining the original reference-responses, $a_1 \ldots a_n$. A new setup procedure 178 is then performed, with the challenges $q_1 \ldots q_n$ which were retrieved, the reference-responses $a_1 \ldots a_n$ which were just decrypted, and the new pass phrase P', as its inputs. This completes the recovery.

This variant is particularly well suited to the use of biometric data in response to a challenge. Biometric information is difficult to replace. A user only has two thumbprints, one voice, and a very limited set of hand-written signatures. If they are compromised, new replacements are hard or impossible to find. For this reason, it must be secured against any revelation to potentially hostile parties.

This embodiment of the invention stores biometric information only in a form which is (a) encrypted with a key hidden in tamper-resistant, secret-hiding software, and (b) further obscured by some data encoding, so that its encryption does not correspond exactly to any standard encryption algorithm.

As a result, there is no need to have a centralized server or other centralized repository for the storage of biometric information. This eliminates a possible exposure of biometric information which could then be used for spoofing attacks by hostile insiders with privileged access to such a server or repository.

Moreover, the comparison function used to match the biometric information never performs a comparison with ordinary data (assuming that the data flow protection is provided as described hereinafter), and further protected by complications in the control flow of the comparing computation (also described hereinafter) so that, even during the performance of the comparison, the biometric information is protected against loss even in the presence of tools such as program tracers, emulators, debuggers, image savers, and other tools for examining the internal, transient states of running programs.

Storing the encrypted biometric information in a form which is both encrypted with key $\alpha_1$ and further encoded with obscure encoding $r_a$ protects the data from attacks which attempt to extract the key from the tamper-resistant, secret-hiding software comprising the first shielded encryptor, which computes a function equivalent to:

FirstShieldedEncrypt $(x) =_{def}$
encode $(r_a,$ encrypt $(\alpha_1, x))$ whereas, in similar fashion, the second shielded encryptor computes a function equivalent to:

SecondShieldedEncrypt $(x) =_{def}$
encode$(r_b,$ encrypt $(\alpha_2, x))$ (In the above equivalent functions, encode returns the result of encoding its right argument according to its left argument, and encrypt returns the result of encrypting its right argument using its left argument as the key.)

While the use of obscure encoding $r_a$ for the stored biometric information $u_1 \ldots u_n$ might have little impact on the security of encryption performed by ordinary software, it makes extraction of a key from the said tamper-resistant, secret-hiding software far harder, because popular attacks used in cipher-breaking attempt to extract information starting at the beginning and the end of the algorithm in order to identify information such as round keys. A successful attack is far more difficult an additional encoding is imposed on top of some standard encryption algorithm: it increases the size of the search space very considerably, since obscure encoding is not separated out from the encryption as in the above equivalent functions, but is inextricably blended with it.

Tamper-resistant, Secret-hiding Techniques

Computer software is generally written by software developers in a high-level language which must be compiled into low-level object code in order to execute on a computer or other processor.

The low-level structure of a software program is usually described in terms of its data flow and control flow. Data-flow is a description of the variables together with the operations performed on them. Control-flow is a description of how control jumps from place to place in the program during execution, and the tests that are performed to determine those jumps.

The intent of tamper-resistant secret-hiding techniques is to obscure the data flow and control flow of the program to the point that it is impracticable for an attacker to obtain any meaningful information from observation of the program. As noted above, the program may process biometric data, for example, in an unprotected form. It is therefore necessary to obscure the processing of this unprotected biometric data so the attacker cannot obtain this information.

As noted above, data flow encoding is described in detail in the co-pending patent application titled "Tamper Resistant Software Encoding", filed as U.S. patent application Ser. No. 09/329,117, control flow encoding is described in detail in the co-pending patent application titled "Tamper Resistant Software—Control Flow Encoding", filed as U.S. patent application Ser. No. 09/377,312.

The concept of data flow encoding is to transform data and data arguments from their real-world form, into a domain which does not have a corresponding high level semantic structure. For example, every value, variable and argument could be transformed from real number values in an (x, y) coordinate space, into new values in a custom (x−y, x+y) coordinate space. This would give the effect of a 45° rotation.

The data flow coding technique which is most appropriate to the protection of biometric data is "bit exploded coding".

The idea is to convert one n-bit variable into n Boolean variables. That is, each bit of the original variable is stored in a separate and new Boolean variable. Each such new Boolean variable is either unchanged or inverted by interchanging true and false. This means that for a 32-bit variable, there are $2^{32}$, a little over 4 billion, bit-exploded codings to choose from.

This encoding is highly suitable for code in which bitwise Boolean operations, constant shifts or rotations, fixed bit permutations, field extractions, field insertions, and the like are performed. Shifts, rotations, and other bit rearrangements have no semantic equivalent in high-level code, since they specifically involve determining which bits participate in which Boolean operations.

For other Boolean operations, the complement operation, which takes a complemented input (if unary) or two complemented inputs (if binary) and returns a complemented result, is clear by application of de Morgan's laws, so dealing with the inversion of some of the variables in the bit-exploded representation is straightforward. Recall that de Morgan's first law states that: not ((not x) and (not y))=x or y, and second law states that: not ((not x) or (not y))=x and y. In general, if op is a binary operation, it is desirable to use the operation op2 such that:

x op2 y=not ((not x) op (not y))

Examples would be that the complement of the and operation is or, and the complement of the or operation is and. The same strategy applies to other operations as well.

For bit-wise Boolean operations, either the operation or its complement on each bit is performed. For example, if a 4-bit variable x has been exploded into 4 Boolean variables a, b, c, d, with a and d uninverted and b and c inverted, then where y has similarly been encoded as a', b', c', d' and z is to be encoded similarly as a", b", c", d", the operation:

z=x and y may be performed by computing:

a"=a and a'
b"=b or b'
c"=c or c'
d"=d and d' since the or operation is the complement of the and operation, and it is the b and c components of each variable which are complemented.

This encoding results in a substantial increase in the number of operations relative to the original program, except for operations which can be "factored out" because they can be done by reinterpreting which variables represent which bits or which bits are in the representation are inverted.

Figure 9:
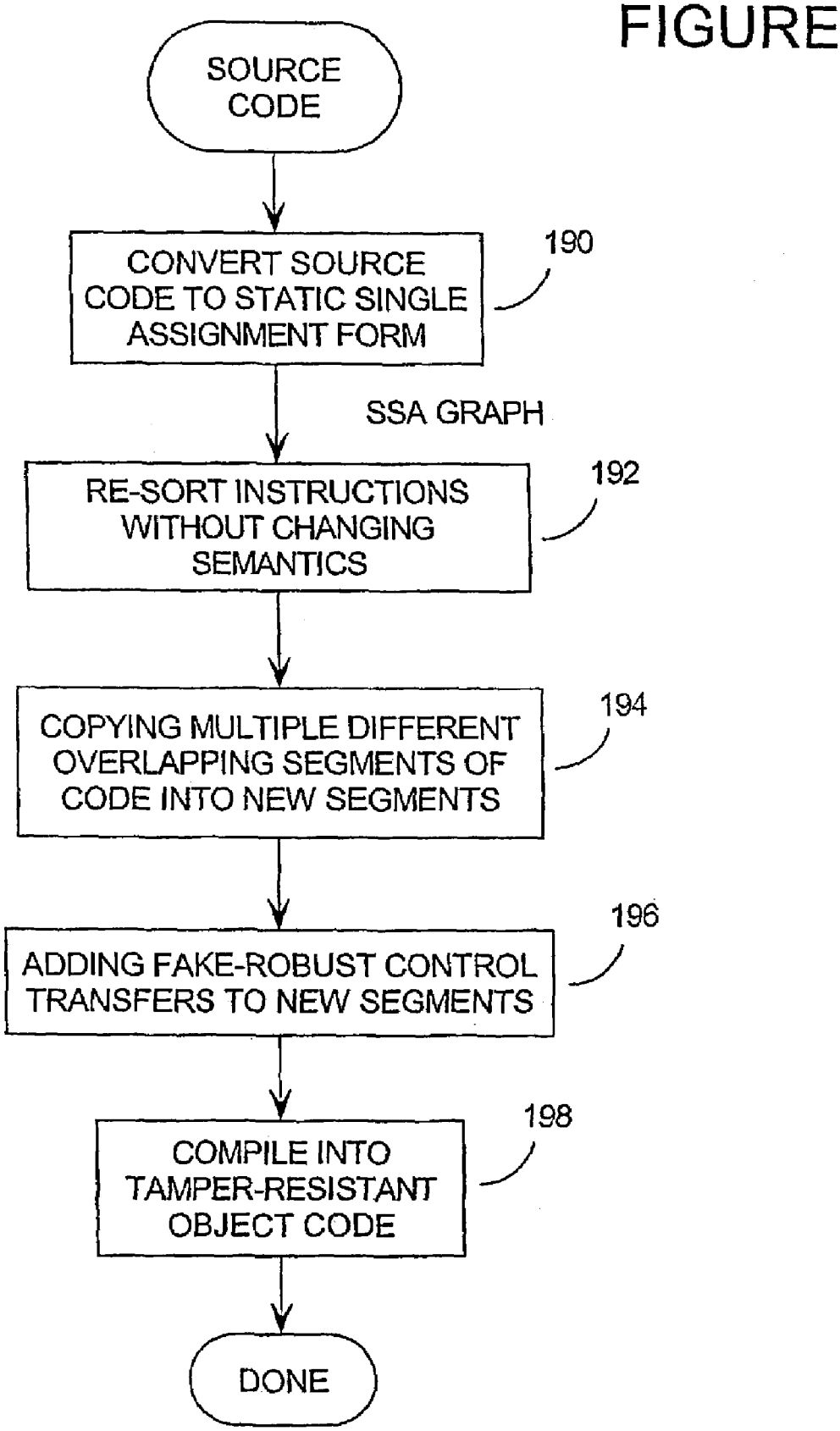
FIG. 9 presents a flow chart of a routine to perform control flow encoding in an embodiment of the invention.

In a corresponding manner, the intent of control flow encoding is to transform the control flow into an extremely complex structure which has no succinct high level structure. The preferred method of effecting this encoding is presented in the flow chart of FIG. 9.

At step 190, source code is converted into some intermediate representation such as static single assignment (SSA) using a compiler front end.

At step 192, the intermediate form instructions are then re-sorted without changing the semantics of the program. Once the code is in an intermediate form, the interdependencies of the intermediate statements are clear and the bounds on what re-sorting could be performed may be easily determined. The understanding of these interdependencies is what allows multi-threading and optimisation techniques as known in the art.

In the case of the invention, these instructions can be re-sorted so that a direct decompiling into high level language yields obscure results. However, an enormously greater benefit is realized with the synergy between re-sorting of the code and the creation of "fake-robust" targets at step 196. In real robustness, software code can tolerate some modification without semantic change and without completely failing. Software code is fake-robust if, irrespective of what input values are used by it during execution, it does not fail or trap, though it may be performing nonsensical operations.

The strategies and limitations for re-sorting the code instructions will vary between applications, and with the type of intermediate code that is used. These restrictions would be clear to one skilled in the art.

At step 194, the re-sorted code is copied into multiple different segments. For example, in a contiguous sequence of ten successive instructions, six distinct segments of five contiguous instructions each, may be identified (namely, the pieces comprising instructions 1 to 5, 2 to 6, 3 to 7, 4 to 8, 5 to 9, or 6 to 10 of the original sequence of ten instructions). Of course, many more distinct segments may be selected from the sequence of ten instructions by choosing segments of different lengths. Some of the selections will consist of segments or sequences of segments that will correctly mirror the functionality of the original program.

At step 196, new control transfer instructions are added to make reference to the new code segments created at step 194. These references will generally be fake-robust as they refer to the segments of the original code that were slightly modified at step 194, but will not be perfectly fake-robust unless measures are taken to ensure they will not fail. Fault-resistant programming techniques are known in the art and could be implemented as desired or required.

Finally, at step 198, the source code is compiled from the tamper-resistant intermediate code, into executable object code using a compiler back end.

Comparing Biometeric Data

Comparison of biometric data generally involves proximity in a multi-dimensional space. This can be compared using distance metrics of various kinds, such as the root-mean-square metric (the root of the average of the squares of the differences between the desired values and the candidate values).

In general, to perform biometric authentication, samples of the desired characteristics are obtained and divided into the following categories:

1. a number of measurements for an individual to be authenticated; and
2. a number of measurements for other individuals.

Typically, a person's subsequent biometric measurements will be closer to those he provided during enrolment than is the case with other individuals. There is some probability of false negatives (where an individual's biometric input falls far from the samples provided at enrolment) and false positives (where some other individual provides an input close to an individual's inputs at enrolment). This can be handled by using multiple biometric inputs, biometric input plus a password, or the like, until a desired degree of accuracy is obtained. The method of the invention is well adapted to this in that multiple challenges and responses are used for the recovery process.

When the system is being developed, this data is processed in the following ways:

1. a 'quality control' phase is employed which either accepts the input or rejects it as of poor quality. For example, this phase is used to weed out blurred finger-prints or voice-prints contaminated with too much background noise;
2. the distance metrics are graphed for the 'same individual' and 'other individual' cases; and
3. based on the results of step 2, a policy is developed for making the decision to accept or reject on the basis of the metric, and possibly to require further confirming biometrics or other authenticating information.

The purpose of using cloaked software in performing this comparison is to avoid revealing the biometric data when performing the comparison (e.g., when computing the root-mean-square metric, and when branching to the 'pass' or 'fail' code as a result of the value of the metric). Without this protection, the computation would expose the biometric information, which is highly undesirable because biometric information cannot be replaced.

Other Variations

Many other implementations of the invention would be clear to one skilled in the art. Several such implementations include:

1. Instead of taking the index values $i_1 \ldots i_t$ as input, these t index values can be generated by a random or pseudo-random process.

This increases security by ensuring that an attacker cannot choose which subset of the t challenges must be met in order to secure access.

2. Instead of generating the key s from a pass phrase P, it can be generated from a combined hash of the reference-responses (or, in the limit, the reference-response). In that case, the recovery procedure replaces the normal access procedure, and a new pass phrase P' is not provided during recovery.

With a small value of t (as low as t=1), the process becomes a pure biometric access technique with n alternative biometric challenges and reference-responses. A value of n as low as n=1 could be used, but it is required that n≧t. It is recommended that n be at least two or three, to avoid denial of access problems due to injury (as with thumb-print) or illness (as with voice-print).

While particular embodiments of the present invention have been shown and described, it is clear that changes and modifications may be made to such embodiments without departing from the true scope and spirit of the invention.

The method steps of the invention may be embodiment in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM) and Read Only Memory (ROM) may be programmed to execute such method steps. As well, electronic signals representing these method steps may also be transmitted via a communication network.

It would also be clear to one skilled in the art that this invention need not be limited to the existing scope of computers and computer systems. Credit, debit, bank and smart cards could be encoded to apply the invention to their respective applications. An electronic commerce system in a manner of the invention could for example, be applied to parking meters, vending machines, pay telephones, inventory control or rental cars and using magnetic strips or electronic circuits to store the software and passwords. Again, such implementations would be clear to one skilled in the art, and do not take away from the invention.

What is claimed is:

1. A method of configuring an access recovery system for a computer system, the method comprising the steps of:
    a) challenging an authenticatee to supply reference responses to one or more challenges through said computer system;
    b) receiving said reference responses;
    c) challenging said authenticatee to supply a string of characters to said computer system, said string of characters to be used as a pass phrase;
    d) receiving said string of characters;
    e) deriving a first encryption key from said pass phrase;
    f) encrypting said reference responses using said first encryption key and saving resulting encrypted reference responses;
    g) deriving at least one second encryption key from said reference responses;
    h) encrypting said first encryption key using said at least one second encryption key and saving said resulting encrypted first encryption key.

2. A method according to claim 1 wherein steps g) and h) comprise the steps of:
    applying at least one hash function to said reference responses to result in a hash of said reference responses;
    encrypting said first encryption key using said hash of said reference responses as said second encryption key and saving an encrypted first encryption key.

3. A method according to claim 2 wherein steps g) and h) further comprise the steps of:
    generating a separate hash value for each of said reference responses to yield a set of cryptographic hash keys;
    prior to encrypting said first encryption key, splitting said first encryption key into a set of shares,
    and wherein each one of said set of shares is encrypted using a separate hash value generated above for each of said reference responses as said second encryption key to result in an encrypted set of shares, said encrypted set of shares being saved as said encrypted first encryption key.

4. A method according to claim 1 wherein step f) comprises the steps of:
    f1) applying at least one hash function to said pass phrase to produce said first encryption key;
    f2) encrypting said reference responses using said first encryption key to produce encrypted reference responses;
    f3) saving said encrypted reference responses.

5. A method according to claim 4 wherein step h) comprises the steps of:
- h1) applying at least one hash function to said reference responses to result in a hash of said reference responses;
- h2) encrypting said first encryption key using said hash of said reference responses as said second encryption key and saving an encrypted first encryption key.

6. A method according to claim 5 further comprising the step of splitting said first encryption key into n components using a sharing function prior to step h2).

7. A method according to claim 5 wherein step h1) preserves proximity and thereby allows for approximate matching during a recovery process.

8. A method according to claim 7 wherein said reference responses comprise at least one piece of biometric data.

9. A method according to claim 6 wherein said sharing function has a property whereby every bit of each share is a function of every bit in said first encryption key.

10. A method according to claim 4 wherein for each member of a set of intermediate reference responses derived from said reference responses, step h) comprises the steps of:
- h1) applying a first tamper-resistant, secret hiding function to said member to result in a first intermediate value $u_i$ and saving said first intermediate value;
- h2) applying a second tamper-resistant, secret hiding function to said member to result in a second intermediate value $v_i$;
- h3) applying a recrypting function to each pair of first and second intermediate values to result in one of said at least one second encryption key.

11. A method according to claim 10 wherein said first tamper-resistant, secret hiding function encrypts said member using a first hidden key $\alpha_1$ and wherein said second tamper-resistant, secret-hiding function encrypts said member using a second hidden key $\alpha_2$.

12. A method according to claim 11 wherein said recrypting function receives both first and second intermediate values and executes the following steps:
- h4) decrypting said first intermediate value using said first hidden key $\alpha_1$ and changing the effects of said first tamper-resistant, secret hiding coding function by producing the decrypted output according to an internal tamper-resistant, secret-hiding coding function;
- h5) decrypting said second intermediate value using said second hidden key $\alpha_2$ and converting the effects of said second tamper-resistant, secret hiding coding function by producing the decrypted output according to the same internal tamper-resistant, secret-hiding coding as employed in step h4);
- h6) if results of steps h4) and h5) match, encrypting a result of step h4) using a third hidden key $\beta$ together with a third external tamper-resistant, secret hiding coding function.

13. A method according to claim 10 wherein said set of intermediate reference responses is a hash of said intermediate responses.

14. A method of access recovery in response to a failure of an authenticatee to authenticate for a computer system, the method comprising the steps of:
- a) challenging said authenticatee to supply responses to at least one stored challenge by way of said computer system and receiving said responses;
- b) retrieving a stored encrypted cryptographic key in digital format, said cryptographic key being derived from a pass phrase;
- c) decrypting said encrypted cryptographic key using said responses supplied in step a) to generate a decrypted cryptographic key;
- d) retrieving a stored set of reference responses, said stored set of reference responses being encrypted using said cryptographic key as a first encryption key;
- e) decrypting said stored set of reference responses using said decrypted cryptographic key, wherein said encrypted cryptographic key is encrypted using at least one second encryption key derived from said reference responses.

15. A method according to claim 14 wherein step a) further comprises the step of:
- challenging said authenticatee to supply responses to a randomly selected subset of said at least one stored challenges.

16. A method according to claim 14 wherein said stored encrypted key comprises a set of encrypted shares derived from said encrypted key, said set of shares being generated by splitting said encrypted key and encrypting each one of said set of shares using at least one second encryption key derived from said reference responses.

17. A method according to claim 14 wherein step c) comprises the steps of:
- c1) applying at least one hash function to said responses supplied in step a) to generate a hash of said responses;
- c2) decrypting said encrypted cryptographic key using results of step c1) to generate said decrypted cryptographic key.

18. A method according to claim 17 further comprising the step of retrieving a stored set of intermediate values $u_i$ stored during a previous setup process, said intermediate values being previously encrypted using a first hidden key $\alpha_1$.

19. A method according to claim 18 wherein step c1) further comprises the steps of:
- c1-1) encrypting said hash of said responses using a second hidden key $\alpha_2$ to result in second intermediate values $v_i$;
- c1-2) applying a recrypting function to each pair of first and second intermediate values to result in said at least one second encryption key for use in generating said decrypted cryptographic key.

20. A method according to claim 19 wherein said recrypting function receives both first and second intermediate values and executes the following steps:
- c1-3) decrypting said first intermediate value using said first hidden key $\alpha_1$;
- c1-4) decrypting said second intermediate value using said second hidden key $\alpha_2$;
- c1-5) if results of steps c1-3) and c1-4) match, encrypting a result of step f4) using a third hidden key $\beta$.

21. A method according to claim 19 wherein said first and second intermediate values are generated using separate first and second tamper-resistant, secret-hiding functions and wherein said recrypting function recodes said tamper-resistant, secret hiding function encodings in steps c1-3) and c1-4) to the same, common internal coding so that they may be compared.

* * * * *